United States Patent [19]
Horikiri

[11] Patent Number: 5,615,185
[45] Date of Patent: Mar. 25, 1997

[54] OPTICAL DISK RECORDING AND REPRODUCING APPARATUS WITH DATA RECORDED AND REPRODUCING APPARATUS WITH DATA RECORDED ON WOBBLED GROOVES AND LANDS

[75] Inventor: Kenichi Horikiri, Zama, Japan

[73] Assignee: Kabushiki Kaisha Kenwood, Tokyo, Japan

[21] Appl. No.: 623,128

[22] Filed: Mar. 28, 1996

Related U.S. Application Data

[62] Division of Ser. No. 263,434, Jun. 21, 1994, Pat. No. 5,537,373.

[30] Foreign Application Priority Data

Jun. 25, 1993 [JP] Japan .................... 5-179780

[51] Int. Cl.$^6$ .................... G11B 7/095
[52] U.S. Cl. .................... 369/44.13; 369/44.29; 369/47
[58] Field of Search .................... 369/44.13, 44.26, 369/44.29, 44.31, 44.35, 47, 50, 54, 58, 111, 124

[56] References Cited

U.S. PATENT DOCUMENTS

| | | | |
|---|---|---|---|
| 4,067,044 | 1/1978 | Maeda et al. .................... | 369/44.13 X |
| 4,232,201 | 11/1980 | Canino .................... | 369/44.13 |
| 5,023,856 | 6/1991 | Raaymakers et al. .................... | 369/44.13 X |
| 5,339,302 | 8/1994 | Takahashi et al. .................... | 369/44.13 X |

Primary Examiner—W. R. Young
Attorney, Agent, or Firm—Sixbey, Friedman, Leedom & Ferguson, P.C.; Gerald J. Ferguson, Jr.

[57] ABSTRACT

An optical disk recording/reproducing apparatus for recording data to and reproducing data from an optical disk engraved with a groove having a wobble waveform corresponding to a signal obtained by FM modulating a carrier serving as a rotation synchronizing signal by address information where the width of the groove may be a half of a track pitch and the depth thereof may be 1/6 to 1/8 of a recording/reproducing laser beam wavelength. Circuitry may be provided for obtaining a push-pull signal from a main spot of a recording/reproducing laser beam and for using the push-pull signal as a tracking error signal. Further circuitry is provided for changing the polarity of the push-pull signal to perform a tracking control at the groove center or at the land center. Circuitry is also provided for recording or reading, while the main spot is controlled to be at the groove center, data on or from the groove center and reading the address information from the push-pull signal of the main spot. Circuitry is also provided for recording or reading, while the main spot is controlled to be at the land center, data on or from the land center and reading the address information from an output of one of divided light receiving elements of the main spot.

6 Claims, 4 Drawing Sheets

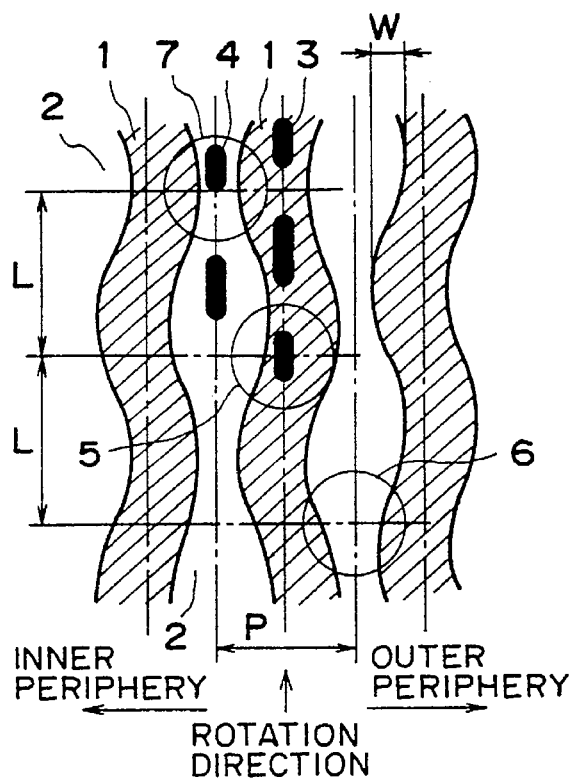
F I G. 1A
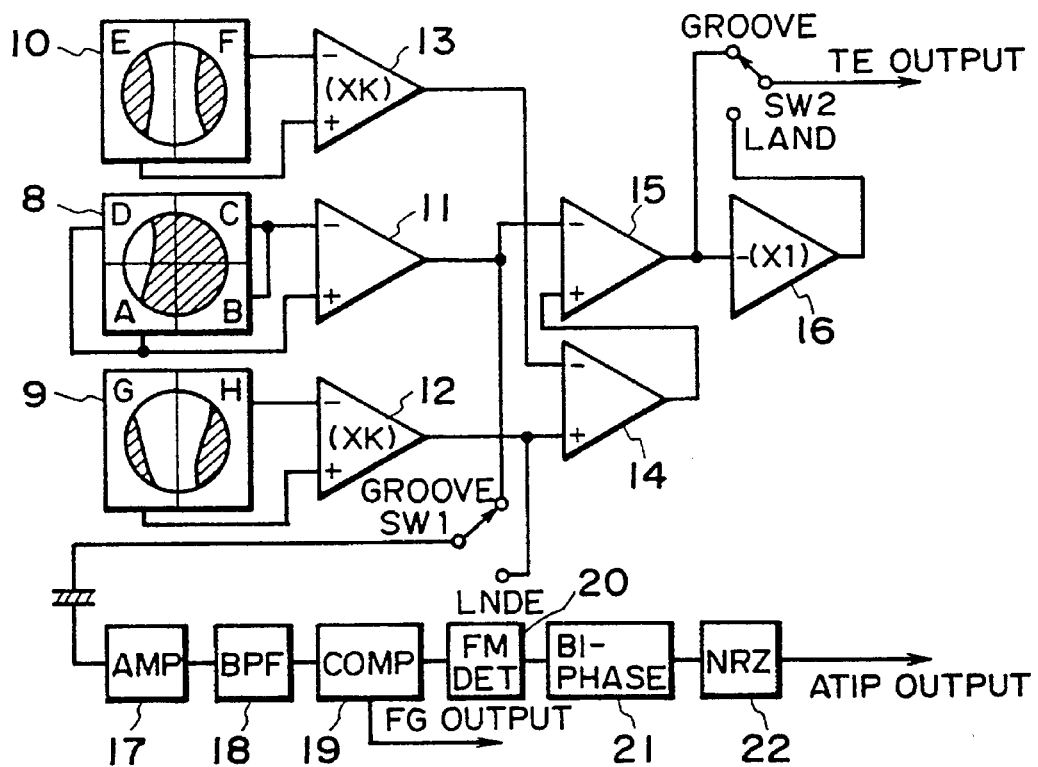
F I G. 1B

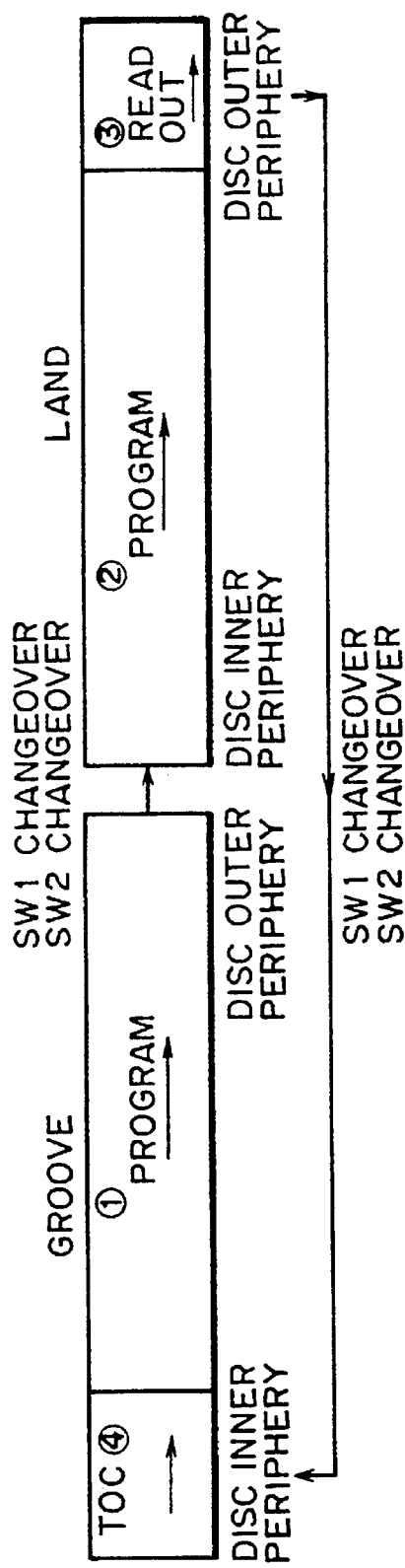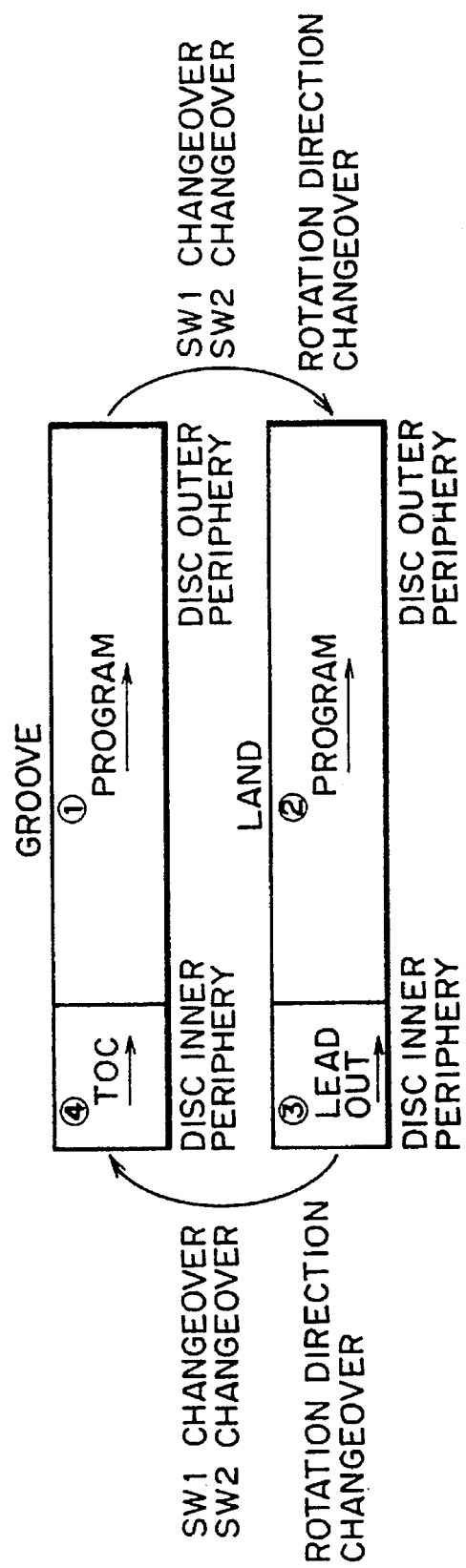

OPTICAL DISK RECORDING AND REPRODUCING APPARATUS WITH DATA RECORDED AND REPRODUCING APPARATUS WITH DATA RECORDED ON WOBBLED GROOVES AND LANDS

This is a divisional application of Ser. No. 08/263,434, filed Jun. 21, 1994, now U.S. Pat. No. 5,537,373.

BACKGROUND OF THE INVENTION

1. Field of the Invention

The present invention relates to an optical disk having a wobble pre-groove, such as a rewritable CD disk and a rewritable photomagnetic disk, and more particularly to a double density recording/reproducing system suitable for a phase change CD disk recording/reproducing apparatus.

2. Related Background Art

An optical disk is known which is used with computers and records data on a groove and a land between adjacent land portions. The groove is straight and address information is recorded as pits on the groove. Addresses are radially formed on sectors, and address information pits are recorded at the top of the sector of each track.

Such a conventional optical disk records data on both the groove and land so that a record capacity is doubled as compared to a disk which records data only on the groove. However, there is a problem that a sufficiently high record density is difficult because the disk is rotated at a constant angular velocity (CAV) and the groove has address information pits. It is also impossible to read address information from the disk for data recording/reproducing to and from the land.

SUMMARY OF THE INVENTION

The present invention has been made under the above circumstances. It is an object of the present invention to provide an optical disk recording/reproducing apparatus capable of obtaining a sufficiently high record density of a disk at a CLV rotation by reading address information recorded as a change in the waveform of a groove during data recording/reproducing not only at the groove but also at the land.

According to one aspect of the present invention, there is provided an optical disk recording/reproducing apparatus for recording data to and reproducing data from an optical disk engraved with a groove having a wobble waveform corresponding to a signal obtained by FM modulating a carrier serving as a rotation synchronizing signal by address information, the width of the groove being a half of a track pitch and the depth thereof being $1/6$ to $1/8$ of a recording/reproducing laser beam wavelength, wherein sub-spots are shifted by a half track pitch in the disk radial direction from a main spot of a recording/reproducing laser beam, a push-pull signal obtained from the main spot is used as a tracking error signal, the polarity of the push-pull signal is changed to perform a tracking control at the groove center or at the land center, while the main spot is controlled to be at the groove center, data is recorded on or read from the groove center and the address information is read from the push-pull signal of the main spot, and while the main spot is controlled to be at the land center, data is recorded on or read from the land center and the address information is read from the push-pull signal of a sub-spot.

In an optical disk recording/reproducing apparatus for recording data to and reproducing data from an optical disk engraved with a groove having a wobble waveform corresponding to a signal obtained by FM modulating a carrier serving as a rotation synchronizing signal by address information, the width of the groove being a half of a track pitch and the depth thereof being $1/6$ to $1/8$ of a recording/reproducing laser beam wavelength, a push-pull signal obtained from a main spot of a recording/reproducing laser beam is used as a tracking error signal, the polarity of the push-pull signal is changed to perform a tracking control at the groove center or at the land center, while the main spot is controlled to be at the groove center, data is recorded on or read from the groove center and the address information is read from the push-pull signal of the main spot, and while the main spot is controlled to be at the land center, data is recorded on or read from the land center and the address information is read from an output of one of divided light receiving elements of the main spot.

In the optical disk recording/reproducing apparatus described above, a disk has a record surface for data recording at the groove center and another record surface for data recording at the land center, each record surface having a read-in area, a program area, and a read-out area in this order from the inner periphery to the outer periphery of the disk, after data was recorded on one of the record surfaces, data is recorded on the other record surface.

In the optical disk recording/reproducing apparatus, TOC including address information is recorded in the read-in area.

In the optical disk recording/reproducing apparatus described above, for one of the data recording at the groove center and the data recording at the land center, an optical disk has a read-in area and a first program area in this order from the inner periphery to the outer periphery of the disk, for the other data recording, the optical disk has a second program area to be continued from the first program area and a read-out area in this order from the inner periphery to the outer periphery of the disk, after data was recorded in the first and second program areas and the read-out area, TOC including address information is recorded in the read-in area.

In the optical disk recording/reproducing apparatus described above, for one of the data recording at the groove center and the data recording at the land center, an optical disk has a read-in area and a first program area in this order from the inner periphery to the outer periphery of the disk, after data was recorded in the first program area, reverse marker information is recorded and thereafter the disk rotation direction and the polarity of the tracking error signal and a wobble signal detector are changed, for the other data recording, the optical disk has a second program area to be continued from the first program area and a read-out area in this order from the outer periphery to the inner periphery of the disk, after data was recorded in the second program area and the read-out area, again the disk rotation direction and the polarity of the tracking error signal and the wobble signal detector are changed, and TOC including address information is recorded in the read-in area.

A flat land is formed between spiral groove portions of an engraved groove. If a tracking error signal for controlling a main spot to be at the center of the groove is obtained from a push-pull signal obtained from the main spot, as in the case of a conventional optical disk recording/reproducing apparatus, this tracking error signal is opposite in phase to a tracking error signal for controlling the main spot to be at the center of the land, because the land is higher than the groove.

Therefore, if the tracking signal is inverted and supplied to a servo control circuit, it becomes possible to change the control position of the main spot from the groove center to the land center.

While the main spot is controlled to be at the center of the land, a sub-spot is at the center of the groove. Therefore, a push-pull signal obtained from the sub-spot is a wobble signal having a waveform of the groove. Similarly, while the main spot is controlled to be at the center of the groove, a sub-spot is at the center of the land. Therefore, a push-pull signal obtained from the main spot is a wobble signal having a waveform of the groove.

If no sub-spot is used, a wobble signal can be obtained from the push-pull signal so long as the main spot is at the center of the groove. However, if the main spot is at the center of the land, it is not possible to obtain a wobble signal from the push-pull signal because the waveforms on both sides of the land are different. In this case, the wobble signal can be obtained by one of divided light receiving elements.

As described above, data recording at the groove and data recording at the land can be distinguished by changing the polarity of the tracking error signal, and addresses can be recognized from the wobble signal. Accordingly, data may be recorded at the groove center on one surface of a disk and at the land center on the other surface. Similar to a conventional optical disk, each of the two surfaces may have a read-in area, a program area, and a read-out area in this order from the inner periphery to the outer periphery of the disk.

Addresses may be set to record data on the groove from the inner periphery to the outer periphery of a disk and thereafter record data on the land. The disk may have a read-in area for each address, a program area, and a read-out area at the last in this order.

A reverse marker may be formed at the outermost periphery of a disk in recording data on the groove from the inner periphery to the outer periphery. When the reverse marker is read, the disk motor is rotated in the reverse direction. Each address is set to record data from the outer periphery to the inner periphery. The disk may have a read-in area for each address, a program area, and a read-out area at the last in this order.

It is possible to record and reproduce data while reading a wobble signal from either the groove or land. Accordingly, a record density two times as large as a conventional optical disk can be achieved under a CLV control. Furthermore, since an address is always monitored, it is easy to display a time and perform a search operation.

BRIEF DESCRIPTION OF THE DRAWINGS

FIG. 1A shows the arrangement of laser spots for groove recording/reproducing of an optical disk recording/reproducing apparatus according to a first embodiment of the invention, and FIG. 1B is a block diagram of an address detecting circuit portion for groove recording/reproducing of the embodiment.

FIG. 5 is a diagram showing another example of recording data on an optical disk by using the apparatus of the first or second embodiment.

FIG. 6 is a diagram showing another example of recording data on an optical disk by using the apparatus of the first or second embodiment.

DETAILED DESCRIPTION OF THE PREFERRED EMBODIMENTS

An optical disk recording/reproducing apparatus according to an embodiment of the invention will be described with reference to the accompanying drawings. In this embodiment, a phase change CD disk is used. Recording/reproducing of a phase change optical disk is performed by using a change in reflectivity with a phase of a recording film. If strong light is applied for a short time to rapidly cool the recording film when recording information, atomic arrangement of a recording film is fixed to a liquid state to become amorphous (solid with disturbed atomic arrangement). Therefore, pits having a low reflectivity are formed.

Pits formed in this manner extinguish if they are maintained for a predetermined time or longer at a crystallization temperature or higher because the amorphous state changes to a crystal state, and the reflectivity takes an initial high reflectivity. Data recorded on an optical disk is reproduced as an intensity change in a reflected beam of a laser spot tracing a train of pits.

Under continuous application of strong light for heating the recording film up to a crystallization temperature or higher, if stronger light is applied for a short time, the previously recorded pits extinguish and new pits are formed. That is, over-write is performed. A pit of a phase change disk is smaller than a spot size because of the thermal conduction characteristics of the disk.

Figure 2A:
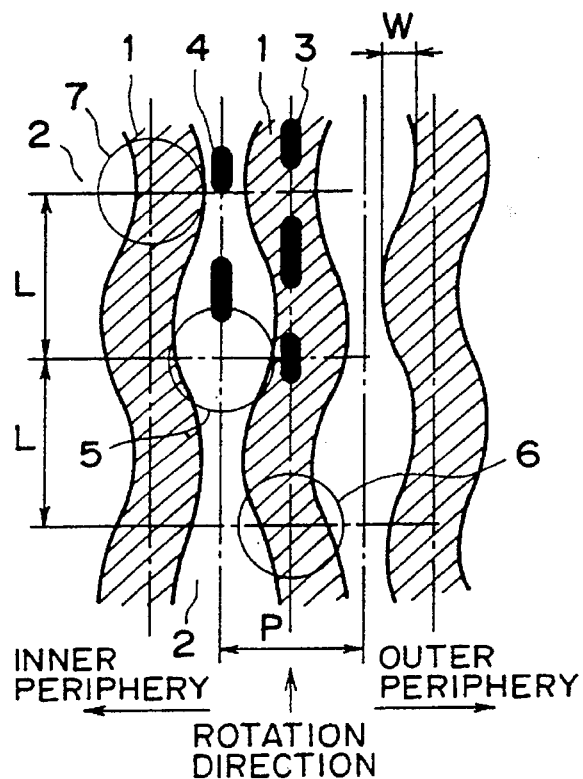
FIG. 2A shows the arrangement of laser spots for land recording/reproducing of the optical disk recording/reproducing apparatus according to the first embodiment of the invention.
Figure 2B:
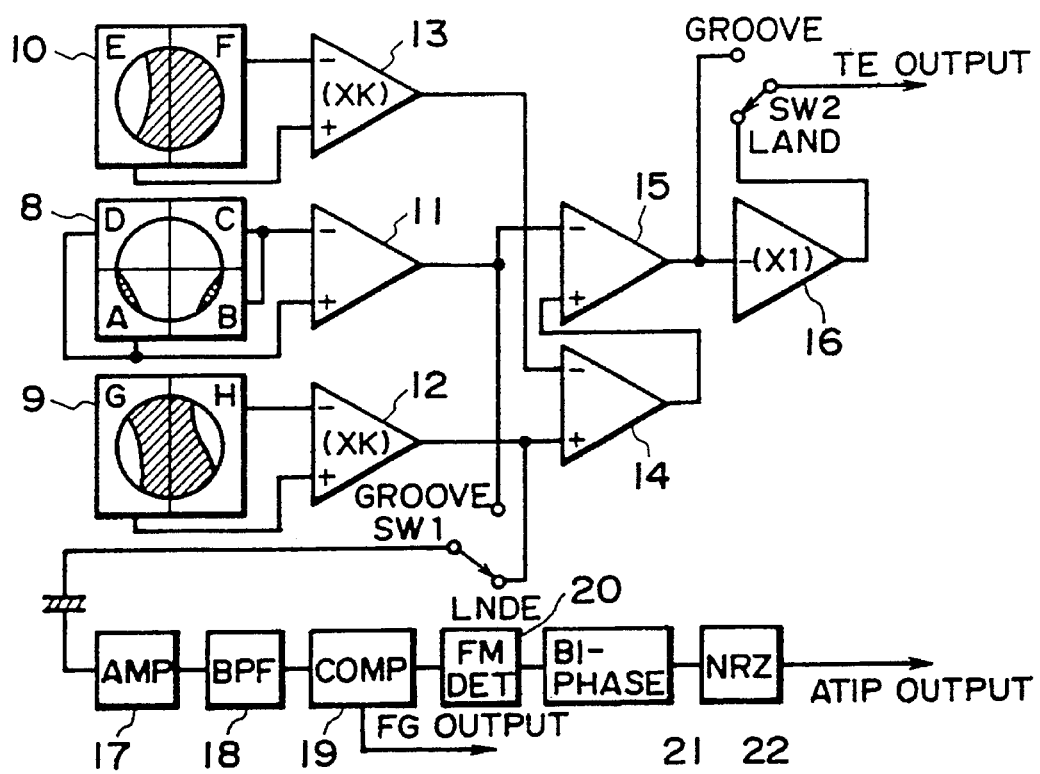
FIG. 2B is a block diagram of an address detecting circuit portion for groove recording/reproducing of the embodiment.

FIGS. 1 and 2 show a first embodiment of the present invention. In FIGS. 1A and 2B, a groove 1 is engraved in the disk surface spirally from the inner periphery to the outer periphery of the disk. In forming a groove, a glass master disk is rotated at a constant linear velocity (CLV) at the mastering process, and a wobble signal is applied thereto which is a bi-phase signal FM-modulating a carrier of 22.05 KHz at a frequency deviation of +/−1 KHz.

The amplitude W of the groove 1 formed in the above manner is 30 nm in the radial direction, and its wavelength changes in the range of from 54 μm to 64 μm in the disk rotation direction. The depth of the groove is set to ⅙ to ⅛ of a laser beam wavelength γ so as to reduce crosstalk between adjacent bits formed on the land and groove.

A track pitch P is 1.6 μm same as a CD disk. The widths of the land and pitch are a half of the track pitch P so as to obtain the same C/N (ratio of carrier to noise) of pit signals recorded to have the same reflectivity.

A laser beam radiated from a laser source in an optical pickup is divided into three beams including a main beam and two sub-beams by a diffraction grading. The three beams pass through a collimator lens, and are applied via a beam splitter to an objective lens to be focussed onto a disk, to thereby form a main spot 5, a front sub-spot 6, and a back sub-spot 7 as shown in FIGS. 1A and 2A.

The front sub-spot 6 is offset by a half of the track pitch in the disk outer periphery direction from the center of the main spot 5, whereas the back sub-spot 7 is offset by the same amount in the disk inner peripheral direction. The sub-spots locate spaced apart from the main spot by L=20 nm from the center of the main spot. At a laser oscillation wavelength λ of 780 nm and an objective lens numerical aperture NA of 0.5, the sizes of the focussed main and sub-beams are about 1.4 μm.

The focussed light amount ratio of the main beam to the sub-beams is 20:1. With an output of 20 mW of the main beam, an output of the sub-beams is about 1 mW so that no pit is recorded by the sub-beams.

The reflected beams of the main spot 5, front sub-spot 6, and back sub-spot 7 are detected by a main detector 8, a front sub-detector 9, and a back sub-detector 10 shown in FIGS. 1B and 2B, and converted into electrical signals. The main detector 8 is a light receiving element divided into four pieces. The main detector 8 detects an RG signal as a sum (A+B+C+D) of outputs from light receiving elements A, B, C, and D, and detects an astigmatism focussing error signal as [(A+C)−(B+D)]. A push-pull signal [(A+D)−(B+C)] of the main spot 5 is obtained as an output of a differential amplifier 11.

The front sub-detector 9 is a light receiving element divided into two pieces, and obtains a push-pull signal (G−H) by differentially amplifying outputs from light receiving elements G and H by a differential amplifier 12. The back sub-detector 10 is a light receiving element divided into two pieces, and obtains a push-pull signal (E−F) by differentially amplifying outputs from light receiving elements E and F by a differential amplifier 13.

A tracking error signal is obtained from the push-pull signal of the main spot. This push-pull signal is offset because the spot on the detector shifts as the spot follows or accesses a disk having a tilt or eccentricity in the radial direction. From the positional relation of the spots on the disk, the track error components of the main spot and sub-spots are opposite in phase, and the offset components of the main spot and sub-spots have the same phase. Therefore, a tracking error signal with the offset components being removed is obtained from a difference between the push-pull signals of the main spot and sub-spots.

Specifically, as shown in FIG. 1B, outputs of the differential amplifiers 12 and 13 are added together by a non-inverting adder 14, and an output of the differential amplifier 11 and an output of the non-inverting adder 14 are differentially amplified by a differential amplifier 15 an output of which is a tracking error signal. In order to make a main push-pull signal level [(A+D)−(B+C)] inputted to the differential amplifier 15 equal to a sub-push-pull signal level K[(E−F)+(G−H)], K is set to 10 while taking the main/sub light amount ratio.

The tracking error signal and an inversion thereof inverted by an inverter 16 are applied to the terminals of a tracking polarity switch SW2. As shown in FIG. 1B, when the tracking error signal is selected by the tracking polarity switch SW2 and supplied to a servo control circuit, the main spot 5 is controlled to locate at the center of the groove as shown in FIG. 1A.

In this state, a wobble detecting switch SW1 selects a wobble signal obtained from the push-pull signal outputted from the differential amplifier 11, and supplies it via a d.c. component eliminating capacitor to an amplifier 17. This amplifier 17 amplifies a small signal and outputs it to a band-pass filter 18 having a band center frequency of 22.05 KHz and eliminates noises and outputs the wobble signal to a comparator 19.

The comparator 19 shapes the wave of the wobble signal to form a rectangular wobble signal which becomes a frequency generator (FG) output used as a rotation synchronizing signal. The FG output has a frequency shift of +/− 1 KHz from the center of 22.05 KHz. Therefore, it is frequency-divided into a frequency of near 1 KHz which is compared with a reference signal and used for the CLV control of a disk motor.

A rectangular output of the comparator 19 is also outputted to an FM demodulator 20 which demodulates the wobble signal to obtain a bi-phase code. The bi-phase code is supplied to an NRZ demodulator 22 which demodulates the bi-phase code to obtain an NRZ signal representative of an ATIP (address code). ATIP is supplied to a system controller so that the controller can recognize an address of data under recording/reproducing.

Under the CLV control described above, the main beam is controlled to form the main spot 5 at the center of the groove while reading the address recorded on the disk. During recording, groove pits 3 are recorded by the main spot 5, and during reproducing, recorded data is read from groove pits 3.

FIGS. 2A and 2B illustrate controlling the main spot 5 to locate at the center of the land 2. In this case, the tracking error signal outputted from the differential amplifier 15 is inverted by the inverter 16 and selected by the tracking polarity switch SW2 to be inputted to the servo circuit. The main spot 5 is therefore controlled to be located at the center of the land 5 as shown in FIG. 2A.

The front sub-spot 6 is at the center of the groove so that its push-pull signal is a wobble signal which is selected by the wobble detecting switch SW1 and applied via the d.c. component eliminating capacitor to the amplifier 17. The operation of processing the wobble signal at the succeeding stages is the same as described with FIGS. 1A and 1B. In this manner, data is recorded on or read from the center of the land.

In recording data on the land, the push-pull signal of the back sub-spot 7 can be used as the wobble signal because the back sub-spot 7 is also at the center of the groove. An average of addresses read from the front and back sub-spots 6 and 7 may be used.

Figure 4:
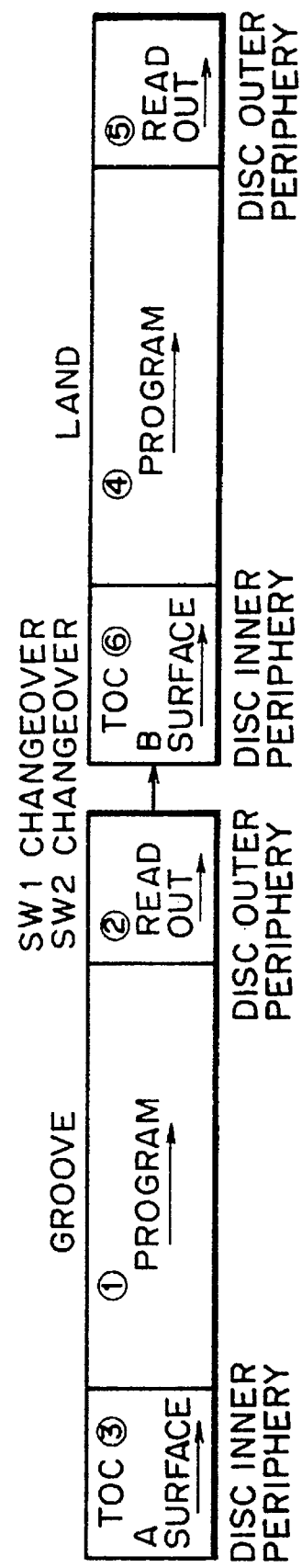
FIG. 4 is a diagram showing an example of recording data on an optical disk by using the apparatus of the first or second embodiment.

An example of the order of recording data is shown in FIG. 4. In this example, a surface A is a groove record surface and a surface B is a land record surface. The surface A has a TOC area (3), a program area (1), and a read-out area (2) in this order from the inner periphery to the outer periphery of a disk. Data is recorded in the order of the program area (1), read-out area (2), and TOC area (3). Surface A identification information is recorded in the TOC area (3).

The surface B has a TOC area (3), a program area (4), and a read-out area (5) in this order from the inner periphery to the outer periphery of the disk. After data was recorded on the surface A, the tracking polarity switch SW2 and wobble detecting switch SW1 are changed to record data in the order of the program area (4), read-out area (5), and TOC area (6) of the surface B. Surface B identification information is recorded in the TOC area (6).

Another example of the order of recording data in an optical disk is shown in FIG. 5. In this example, the groove record surface has a TOC area (4) and a program area (1) in this order from the inner periphery to the outer periphery of a disk, and the land record surface has a program area (2) and a read-out area (3) in this order from the inner periphery to the outer periphery of the disk.

After data was recorded in the program area (1), the tracking polarity switch SW2 and wobble detecting switch SW1 are changed to record data in the order of the program area (2) and read-out area (3). Again, the tracking polarity switch SW2 and wobble detecting switch SW1 are changed to record data in the TOC area (4). Groove and land record surface identification information is recorded in the TOC area (4).

Another example of the order of recording data in an optical disk is shown in FIG. 6. In this example, the groove record surface has a TOC area (4) and a program area (1) in this order form the inner periphery to the outer periphery of a disk, and the land record surface has a program area (2) and a read-out area (3) in this order from the outer periphery to the inner periphery of the disk.

After data was recorded in the program area (1), the tracking polarity switch SW2 and wobble detecting switch SW1 and the rotation direction of a disk motor are changed to record data in the order of the program area (2) and read-out area (3). Again, the tracking polarity switch SW2 and wobble detecting switch SW1 and the rotation direction of the disk motor are changed to record data in the TOC area (4). Groove and land record surface identification information is recorded in the TOC area (4). When the disk motor rotates in the reverse direction, the order of serial data of the wobble signal is also reversed so that a decoder decoding the signal in the reverse direction is used.

Figure 3:
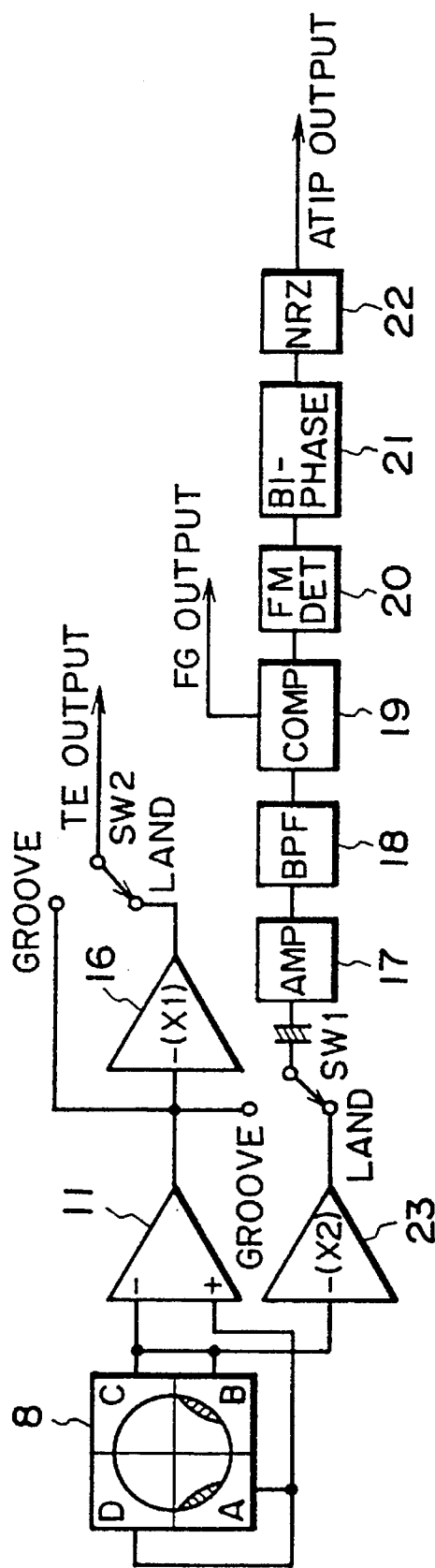
FIG. 3 is a block diagram of an optical disk recording/reproducing apparatus according to a second embodiment of the present invention.

FIG. 3 shows a second embodiment of the invention. In this embodiment, no sub-spot is formed. An output of a main detector 8 receiving a reflected main spot beam is differentially amplified by a differential amplifier 11 to obtain a tracking signal. A tracking signal and its inversion inverted by an inverter 16 are selected by a tracking polarity switch SW2 which control the main spot to be located at the center of either a groove or a land. While the main spot is controlled to be at the center of the groove, the wobble signal is obtained from the push-pull signal of the main detector 8. While the main spot is controlled to be at the center of the land, an output of light receiving elements (C+D) of the main detector 8 is inverted by an inverter 23 to obtain the wobble signal. A wobble detecting switch SW1 selects one of the wobble signals in accordance with the groove record or land record, and outputs it to an amplifier 17. The operation of processing the wobble signal at the succeeding stages is the same as the first embodiment.

The invention is not limited to the above embodiments. For example, the invention is applicable not only to a phase change type CD but also CD-WO (compact diskwrite-once), a photomagnetic disk, and a so-called mini disk.

According to the present invention, a currently available CLV disk can be recorded at a double density by slightly changing the circuit of an optical disk recording/reproducing apparatus.

What is claimed is:

1. An optical disk recording/reproducing apparatus for recording data to and reproducing data from an optical disk engraved with a groove having a wobble waveform corresponding to a signal obtained by FM modulating a carrier serving as a rotation synchronizing signal by address information, the width of the groove being a half of a track pitch and the depth thereof being 1/6 to 1/8 of a recording/reproducing laser beam wavelength, means for obtaining a push-pull signal from a main spot of a recording/reproducing laser beam and for using the push-pull signal as a tracking error signal, means for changing the polarity of the push-pull signal to perform a tracking control at the groove center or at the land center, means for recording or reading while the main spot is controlled to be at the groove center, data on or from the groove center and reading the address information from the push-pull signal of the main spot, and means for recording or reading while the main spot is controlled to be at the land center, data on or from the land center and reading the address information from an output of one of divided light receiving elements of the main spot.

2. An optical disk recording/reproducing apparatus for recording data to and reproducing data from an optical disk engraved with a groove having a wobble waveform corresponding to a signal obtained by FM modulating a carrier serving as a rotation synchronizing signal by address information, comprising:

optical pickup means for applying an optical beam spot to the groove or land;

switch means for making a changeover between a groove center mode and a land center mode, in the groove center mode the beam spot is controlled to run on the groove and in the land center mode the beam spot is controlled to run on the land;

light receiving means provided with divided light receiving areas for receiving the optical beam reflected from the optical disk;

means for recording/reproducing a signal onto/from the groove and forming an address signal as a push-pull signal from the divided light receiving areas when the groove center mode is selected by said switch means; and means for recording/reproducing a signal onto/from the land and forming an address signal as a non push-pull signal from portion of the divided light receiving areas when the land center mode is selected by said switch means.

3. An optical disk recording/reproducing apparatus according to claim 2, wherein optical disk has a first surface on which data is recorded in the groove center mode and a second surface on which data is recorded in the land center mode, each of the first and second surface has lead-in area, program area and read-out area, the apparatus further comprising means for conducting the recording on the first surface of the optical disk and then the recording on the second surface of the optical disk.

4. An optical disk recording/reproducing apparatus according to claim 3, further comprising means for recording TOC information including addresses into the lead-in area.

5. An optical disk recording/reproducing apparatus according to claim 2, wherein in one of the groove center mode and the land center mode a lead-in area and a first program area are sequentially recorded from the inner side to the outer side on a first surface of the optical disk, and in the other of the groove center mode and the land center mode a second program area following the first program area and a lead-out area are sequentially recorded from the inner side to the outer side on a second surface of the optical disk, the apparatus further comprising:

means for conducting a recording on the first and second program areas and lead-out area; and means for conducting a recording of TOC information including addresses on the lead-in area.

6. An optical disk recording/reproducing apparatus according to claim 2, wherein in one of the groove center mode and the land center mode a lead-in area and a first program area are sequentially recorded from the inner side to the outer side on a first surface of the optical disk, and in the other of the groove center mode and the land center mode a second program area following the first program area and a lead-out area are sequentially recorded from the inner side to the outer side on a second surface of the optical disk, the apparatus further comprising:

means for recording data and then reverse marker in the first program area;

means for taking a first disk rotation direction, a first polarity of tracking error and a first wobble signal detector after said data and reverse marker recording;

means for recording data in the second program area and the lead-out area; and means for taking a second disk rotation direction, a second polarity of tracking error and a second wobble signal detector.

\* \* \* \* \*